United States Patent
Madan et al.

(10) Patent No.: US 11,663,063 B2
(45) Date of Patent: May 30, 2023

(54) REDUCING FALSE POSITIVE FAILURE EVENTS IN A HEALTH MONITORING SYSTEM USING DIRECTIONAL GRAPHS

(71) Applicant: EMC IP Holding Company LLC, Hopkinton, MA (US)

(72) Inventors: Nitin Madan, Cupertino, CA (US); Fani Jenkins, Boulder, CO (US); Deepa Ramesh, Cupertino, CA (US); Gobikrishnan Sundharraj, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 5 days.

(21) Appl. No.: 17/363,595

(22) Filed: Jun. 30, 2021

(65) Prior Publication Data
US 2023/0004457 A1    Jan. 5, 2023

(51) Int. Cl.
*G06F 11/00*      (2006.01)
*G06F 11/07*      (2006.01)

(52) U.S. Cl.
CPC ...... *G06F 11/0751* (2013.01); *G06F 11/0721* (2013.01); *G06F 11/0793* (2013.01)

(58) Field of Classification Search
CPC .......... G06F 11/0751; G06F 11/0721; G06F 11/0793; G06F 11/0766; G06F 11/0706; G06F 11/0703; G06F 11/3003
See application file for complete search history.

(56) References Cited

U.S. PATENT DOCUMENTS

| | | | |
|---|---|---|---|
| 2019/0007263 A1* | 1/2019 | Lahiri | G06F 11/1433 |
| 2019/0258535 A1* | 8/2019 | Morisse | G06F 11/0772 |

* cited by examiner

*Primary Examiner* — Katherine Lin
(74) *Attorney, Agent, or Firm* — Staniford Tomita LLP (57) ABSTRACT

Embodiments for reducing panic shutdown of components in a pipelined data processing system. Components are monitored for health, processing progress, and dependencies during normal system operation. A directed graph is generated showing non-circular dependencies of components in the pipeline. Deadlock of a particular component may or may not signal a panic condition depending on whether any of its presently downstream and depended on components are operating properly. The continuously monitored knowledge of proper operation of all downstream components is thus used to intelligently apply or defer panic alerts to keep the system operating uninterrupted from panic conditions that might soon or eventually be fixed by continued operation of the system pipeline.

19 Claims, 8 Drawing Sheets

REDUCING FALSE POSITIVE FAILURE EVENTS IN A HEALTH MONITORING SYSTEM USING DIRECTIONAL GRAPHS

TECHNICAL FIELD

This invention relates generally to file system health monitoring systems, and specifically to monitoring recovery progress to eliminate unnecessary panic events.

BACKGROUND

Backup software is used by large organizations to store their data for recovery after system failures, routine maintenance, archiving, and so on. Backup sets are typically taken on a regular basis, such as hourly, daily, weekly, and so on, and can comprise vast amounts of information. Backup programs are often provided by vendors that provide backup infrastructure (software and/or hardware) to customers under service level agreements (SLA) that set out certain service level objectives (SLO) that dictate minimum standards for important operational criteria such as uptime and response time, etc. Within a large organization, dedicated IT personnel or departments are typically used to administer the backup operations and work with vendors to resolve issues and keep their infrastructure current.

In most complex systems, there is a method to detect when service-level objectives (SLO) are not met. For example, if a job does not complete in a desired amount of time, the SLO is not met. The problem with this technique is that a job may need to be processed by more than one subsystem, each adding a level of uncertainty to the job, and not just in terms of time. The Data Domain File System (DDFS) uses an internal heartbeat monitor thread (HMON) (also referred to as a 'health monitor') to ensure that a job is making progress through a set of registered subsystems. When a subsystem does not make progress for a predetermined amount of time, the HMON subsystem flags this as an error and triggers a filesystem panic. A panic condition is triggered in order to recover the filesystem in case of genuine deadlock. These panics are very disruptive, not only to the operations of DDFS, but also to clients relying on DDFS to complete backups within a usually tight backup window. Reducing DDFS panics is, therefore, very vital to increasing system availability.

The problem with using a time-based approach to triggering panics in DDFS is that one subsystem is not aware of the progress being made in another subsystem. In present systems, hard-coded timeout values are used to detect stalled requests. Most often, these timeout values have to be adjusted for new system configurations. It would be advantageous to reduce the need for these adjustments and thereby minimize unnecessary interruptions to the customer workloads.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), and metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
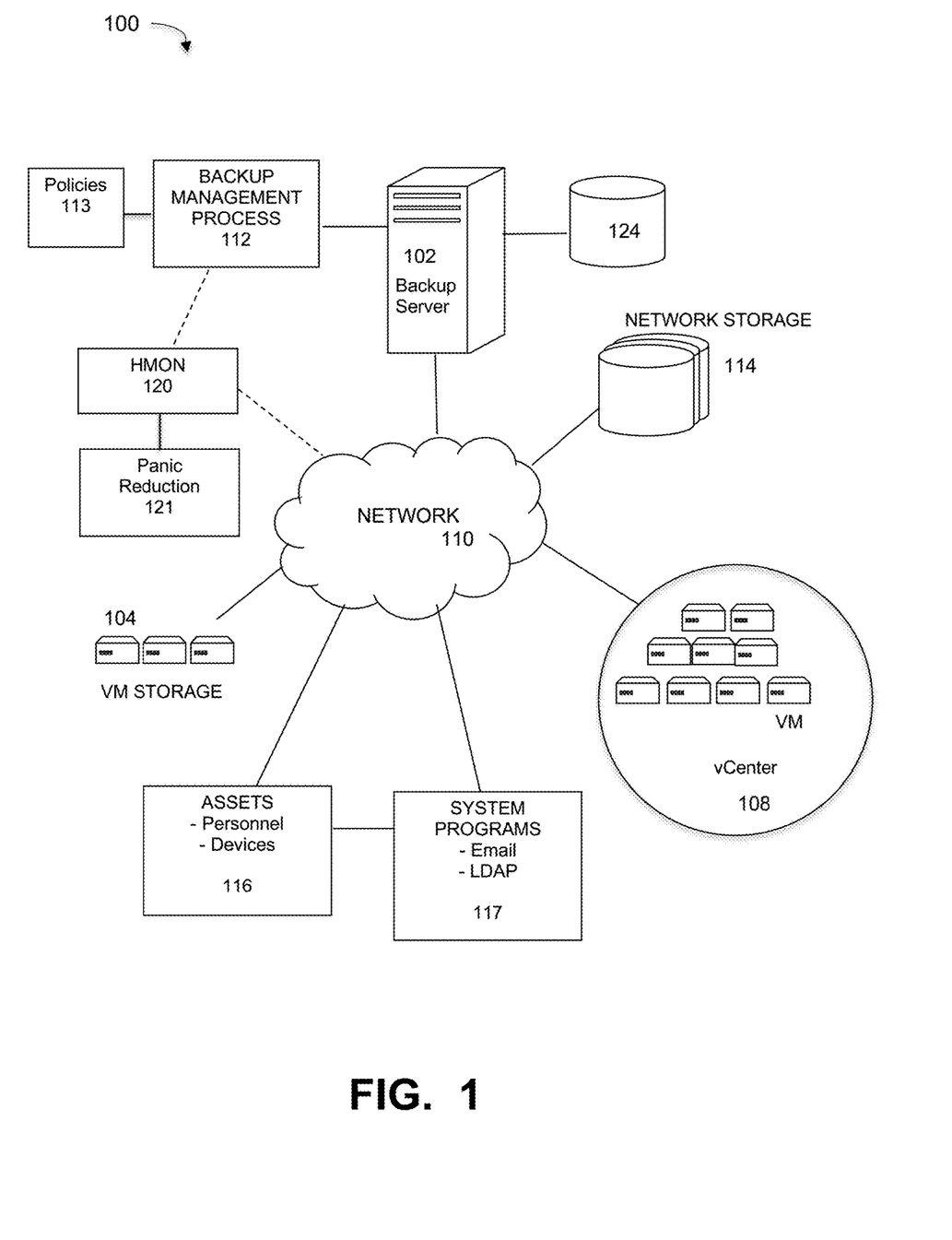
FIG. 1 is a diagram of a network implementing a false positive panic reduction method for a heartbeat monitor, under some embodiments.

FIG. 1 illustrates a computer network system that implements one or more embodiments of implementing organization awareness for automating data protection policies, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs may be provided to serve as backup targets. FIG. 1 illustrates a virtualized data center (vCenter) 108 that includes any number of VMs for target storage. The backup server implements certain backup policies 113 defined for the backup management process 112, which set relevant backup parameters such as backup schedule, storage targets, data restore procedures, and so on. In an embodiment, system 100 may comprise at least part of a Data Domain Restorer (DDR)-based deduplication storage system, and storage server 102 may be implemented as a DDR Deduplication Storage server provided by DellEMC Corporation. However, other similar backup and storage systems are also possible.

The network server computers are coupled directly or indirectly to the network storage 114, target VMs 104, data center 108, and the data sources 106 and other resources 116/117 through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing Backup software vendors typically provide service under a service level agreement (SLA) that establishes the terms and costs to use the network and transmit/store data specifies minimum resource allocations (e.g., storage space) and performance requirements (e.g., network bandwidth) provided by the provider. The backup software may be any suitable backup program such as EMC Data Domain, Avamar, and so on. In cloud networks, it may be provided by a cloud service provider server that may be maintained be a company such as Amazon, EMC, Apple, Cisco, Citrix, IBM, Google, Microsoft, Salesforce.com, and so on.

In most large-scale enterprises or entities that process large amounts of data, different types of data are routinely generated and must be backed up for data recovery purposes. This data comes from many different sources and is used for many different purposes. In a large-scale network, such as a cloud network, data may be processed through a number of subsystems or layers in a network file system stack from the file system itself to a cloud access layer, and through number of subsystem layers (e.g., content store, segment store, etc.). Each layer or subsystem in the stack represents a link in the overall processing chain in that data must be processed in an earlier or upstream subsystem before it can be processed in a later or downstream subsystem. Each subsystem typically maintains a queue of data processing requests, and clears its queue by successfully processing the data within a defined time period. If any subsystem exceeds its time limit, its queue will overflow, which can cause problems for all the downstream subsystems.

For the embodiment of FIG. 1, which is typically a Data Domain system, the DD file system (DDFS) includes an internal heartbeat monitor thread or process (HMON) 120 that monitors the health of the various subsystems within the DDFS process. If the HMON 120 determines that a subsystem has either hung up or been waiting too long, it terminates the DDFS process. After such a termination, the DDFS typically attempts automatically restart and resume normal operation, which requires that any operations that were ongoing, such as restores/backups (i.e., reads/writes) will be interrupted and need to be restarted. This reaction is referred to as a 'panic' condition and is done to recover the filesystem in case of a genuine deadlock within a subsystem, or between two subsystems. Currently, the HMON process 120 uses a hard-coded timeout value defined for each subsystem. If a subsystem remains hung up in excess of this time period, the HMON detects stalled requests and signals a panic situation.

In many cases, however, processing of data requests may actually be progressing in a different subsystem, and a stalling subsystem may not be aware of the progress made in that other subsystem. In this case, generating a panic condition may actually be counterproductive as this is a false positive situation with respect to a genuine deadlock. In an embodiment, system 100 includes a false positive panic reduction process 121 to allow the health monitor 120 to distinguish between a subsystem that is making progress and one that is genuinely deadlocked. Process 121 transfers progress related state information from one subsystem to another subsystem using a directional graph, thus allowing for a system-wide awareness in deciding when to panic. Using this approach, process 121 removes incorrect (false positive) panics triggered by the predetermined timeout values in HMON 120, and increases system availability by intelligent and accurate inheritance based health monitoring.

Although embodiments are described with respect to Data Domain and DDFS systems using a heartbeat monitor thread, embodiments are not so limited, and the panic reduction process 121 can be used with respect to any health monitoring process in complex environments comprised of multiple, interdependent systems.

For the embodiment of FIG. 1, the HMON 120 and panic reduction process 121 may both or either be implemented as a component that runs within a data protection infrastructure, and can be run as an independent application or embedded into an instance of data protection software 112 or as part of a data protection appliance. Any of those implementations may also be on-premise implementations on client machines within a user's data center or running as a hosted service within the cloud.

Figure 2:
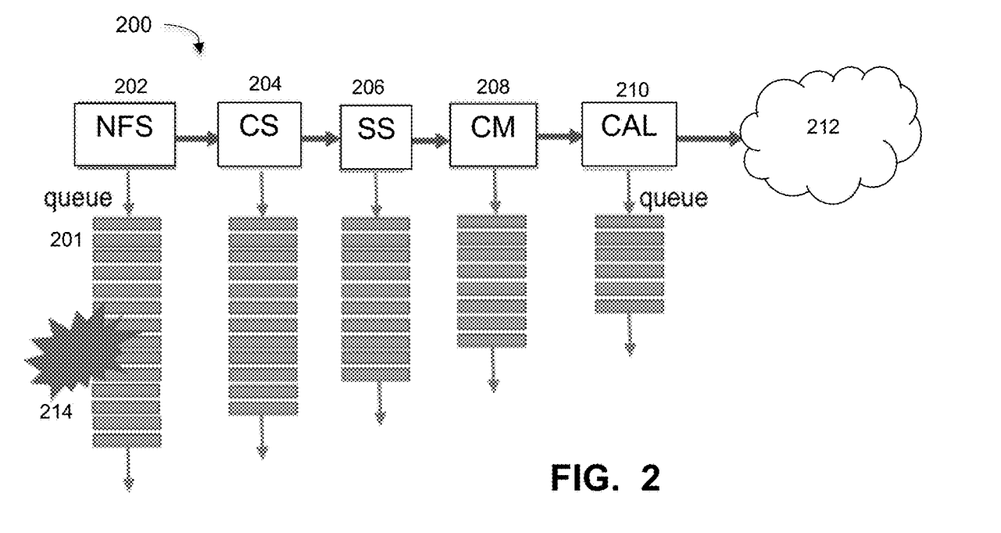
FIG. 2 illustrates a data processing pipeline comprising multiple subsystems, under some embodiments.

As stated above, in a DDFS (or similar) system that employs a file system writing data between data sources and targets, such as cloud networks, a series of subsystems typically processes the data. FIG. 2 illustrates a data processing pipeline comprising multiple subsystems, under some embodiments. As shown in FIG. 2, data flows through system 200 from the network file system (NFS) 202 in a pipelined fashion to cloud storage 212 through multiple subsystems 204-210, which each receives the data, manipulates it as needed, and passes it down to the next subsystem. Typically, each subsystem is sized with enough resources to accommodate a steady flow of data, as long as the clients stay within certain well-defined limits. Each subsystem maintains its own queue (e.g., queue 201 for NFS 202) to order backed up data requests. When one subsystem of the file system is either completely stuck or making slower than expected progress, its request queues become full and this subsystem can no longer accept any new requests. This impacts the upstream subsystems (in front of the impacted subsystem), and they start exhibiting the same behavior.

At some point, if there are requests that have been queued for an excessively long time (i.e., exceeding a pre-determined timeout threshold value), the HMON 120 subsystem will trigger a timeout panic. In the example shown in the FIG. 2, the CAL (Cloud Access Layer) subsystem 210 sends and receives requests to cloud storage 212, which can suffer from its high and unpredictable latencies. If the cloud latencies are high, the Cloud Access Layer 210 read or write queues may get depleted, causing the higher subsystem to block, while they wait to allocate a new request. Thus, a timed-out request in any of the queues in downstream layers 204 to 210 may ultimately cause the NFS queue 201 to be deadlocked 214. This can lead to timeout panics in the NFS subsystem 202, as shown in FIG. 2 or any of the intermediate subsystems, such as Content Store (CS) 204, Segment Store (SS) 206, or Container Manager (CM) 208. In present systems, such a panic might be triggered even if the Cloud Access Layer subsystem 210 is still processing requests, albeit at slower speeds.

Figure 3:
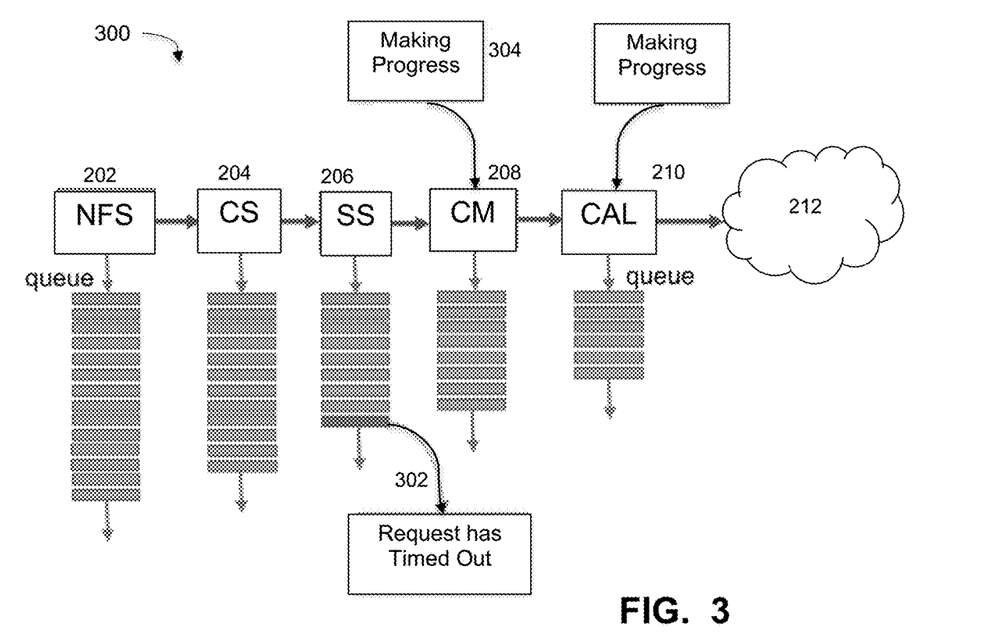
FIG. 3 shows an example where a request results in a subsystem timing out, but is flagged as a false positive panic.

FIG. 3 shows an example where a request in Segment Store 206 has timed out 302, which might normally result in a panic condition, but is flagged as a false positive panic. The Segment Store subsystem 206 is dependent on the Container Manager (CM) 208 and Cloud Access Layer 210 subsystems to get its request processed. Furthermore, both the Container Manager 208 and Cloud Access Layer 210 subsystems, are making progress 304 in processing their requests, as shown. In an embodiment, the panic reduction process 121 extends the timeout period in the Segment Store subsystem (and/or any other appropriate intermediate layer) to prevent a momentary deadlock from creating a panic condition. The extension of the timeout period for this layer provides enough time for the other layers to clear their queues and remove the threat of deadlock within the Segment Store. The timeout period can be extended by a defined formula, such as the doubling (or tripling) of the existing timeout period, or any other increase that is determined to be sufficient to provide time for downstream subsystems to clear their queues. With the panic reduction process 121 approach, this DDFS panic from Segment Store 206 would be eliminated given this continuing progress by its downstream subsystems (CM and CAL).

In an embodiment, the panic reduction process builds a directional dependency graph and checks the progress of subsystems on which a particular problem subsystem (e.g., SS 206 in FIG. 3) is dependent upon. For the example of FIG. 3, such a check would provide the information that the Container Manager and Cloud Access Layer subsystems are processing requests, and will eventually catch up to the SS request which has timed out. This insight is used to invalidate the need for a panic, and thus keep the system availability online and uninterrupted. FIG. 3 illustrates the case of a false positive panic condition that is eliminated by process 121.

Figure 4:
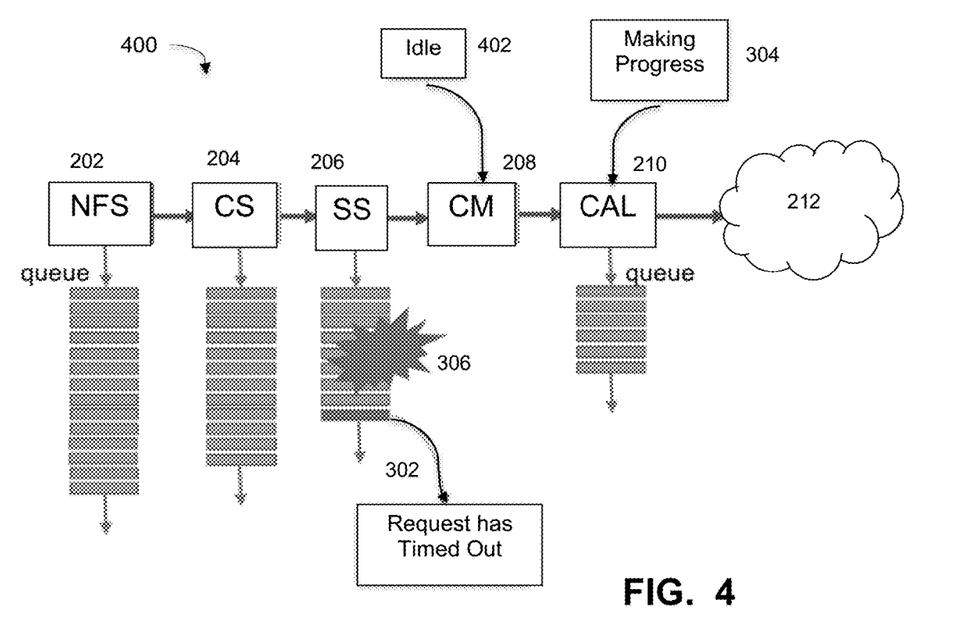
FIG. 4 illustrates an example where a request results in a subsystem timing out, and is processed as a genuine panic condition.

There are cases, however, where a panic condition is genuine (not a false positive) in which case, the panic reduction process 121 does not interfere with the HMON panic trigger. FIG. 4 illustrates an example where a request in Segment Store 206 has timed out 302, but is a genuine panic condition that is allowed to trigger a panic. For the example of FIG. 4, Segment Store 206 has timed out 302, and while Cloud Access Layer 210 is still making process 304 as before, the CM 208 subsystem is idle 402 and not processing any requests. In this case, the HMON 120 will correctly classify this as a stuck Segment Store request and identify the panic condition caused by the deadlocked queue 306 is valid, and the panic reduction process 121 will not flag this as a false positive to block the panic trigger.

In general, each subsystem (component) may have its own defined timeout period, such as five seconds for one component and five seconds for another component, and the extension period can be defined differently for each component as well, such as twice the initial timeout period versus three times the initial timeout period for different components.

In an embodiment, the panic reduction process is implemented using a dependency graph that is established between subsystems. For the examples of FIGS. 2, 3, and 4, the process would establish a dependency between the Segment Store 206 and Cloud Access Layer 210 subsystems. As can be seen in FIG. 4, the Segment Store 206 is dependent on the Cloud Access Layer 210 and it inherits its state. If the Cloud Access Layer subsystem is making progress (not stuck), the Segment Store subsystem will assume the same state when handling request timeouts. In general, 'progress' is defined as the processing of at least some I/O requests through the queue of a subsystem at a minimal rate. If I/O request processing is too slow or stopped for a certain period of time, the processing is stalled and the component is at least temporarily 'deadlocked.'

Determining dependencies between different subsystems in a complex system (e.g., DDFS) requires a certain balance since adding too many dependencies runs the risk of affecting system performance. In an embodiment, the dependencies are determined by identifying the subsystems that are most likely to be bottlenecks and create a dependency from the rest of the subsystems to these 'bottleneck' subsystems.

In an illustrative embodiment, the description will focus on the Cloud Access Layer subsystem. In this system, the Cloud Access Layer 210 interfaces directly with the Cloud Storage 212, where there may be high or unpredictable latencies. The rest of the subsystems depend on the Cloud Access Layer subsystem to get their requests completed. However, it should be noted that embodiments are not so limited, and dependencies can be described with any subsystem within the pipeline.

Figure 5:
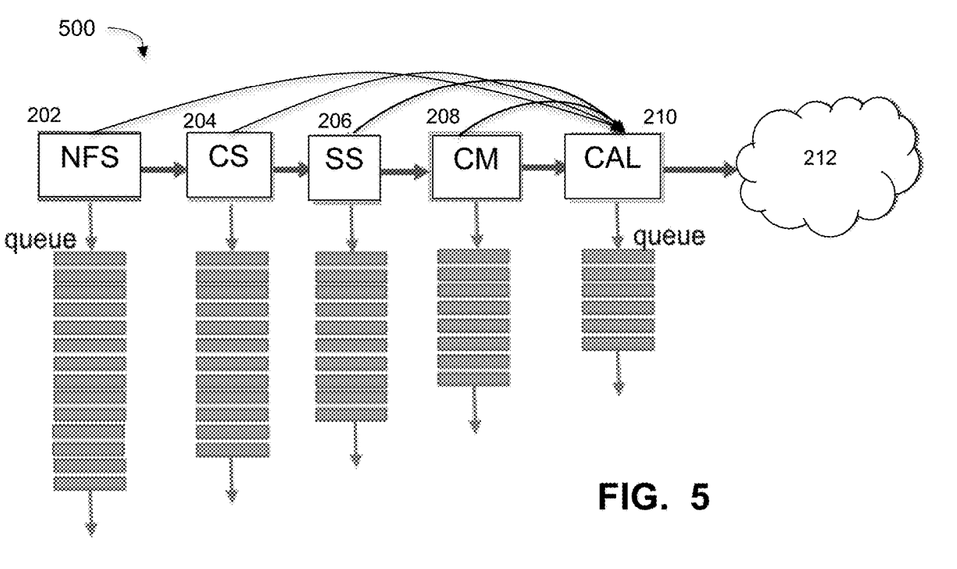
FIG. 5 illustrates dependencies between the intermediate Network File System, Content Store, and Segment Store subsystems to the Cloud Access Layer subsystem, under an example embodiment.

FIG. 5 illustrates dependencies between the intermediate Network File System, Content Store, Segment Store, and Container Manager subsystems to the Cloud Access Layer subsystem, under an example embodiment. For this embodiment, the Cloud Access Layer subsystem is designated as the end node of the directional dependency graph, though other embodiments may use other subsystems as the end node. As shown in FIG. 5, diagram 500 shows pointers from each of the NFS 202, CS 204, SS 206, and CM 208 subsystems to the CAL 210 as the end node prior to the cloud storage 212. This dependency relationship provides the basis to create a dependency graph that is used to eliminate timeout panics that happen due to external cloud provider inefficiencies and lack of predictability.

This is but one example of a system with dependencies on one component (e.g., a Cloud Access Layer). However, this method is extensible to more complex dependencies. For example, if NFS is dependent on SS and SS is dependent on CM which could be dependent on CAL. In such an environment, the chaining of dependencies would be detected using directional graphs.

This method is also extensible to components beyond a single machine, instead of layers within a single file system (as shown in FIG. 5). For example, a component C1 is dependent on a component C2 which is in-turn dependent on component C3, as in: C1→C2→C3, where each of C1, C2, and C3 are completely different physical entities, such as independent computers or nodes connected by a network. In a normal environment, a slowness in C3 may cause service unavailability on C1 or C2, because of the pipeline nature of the components. However, the proposed method may detect that C3 is slow, and therefore it may be acceptable to extend absolute timeouts on C1 and C2, to prevent a momentary deadlock from raising a panic condition.

Directed Graph Creation

Figure 6:
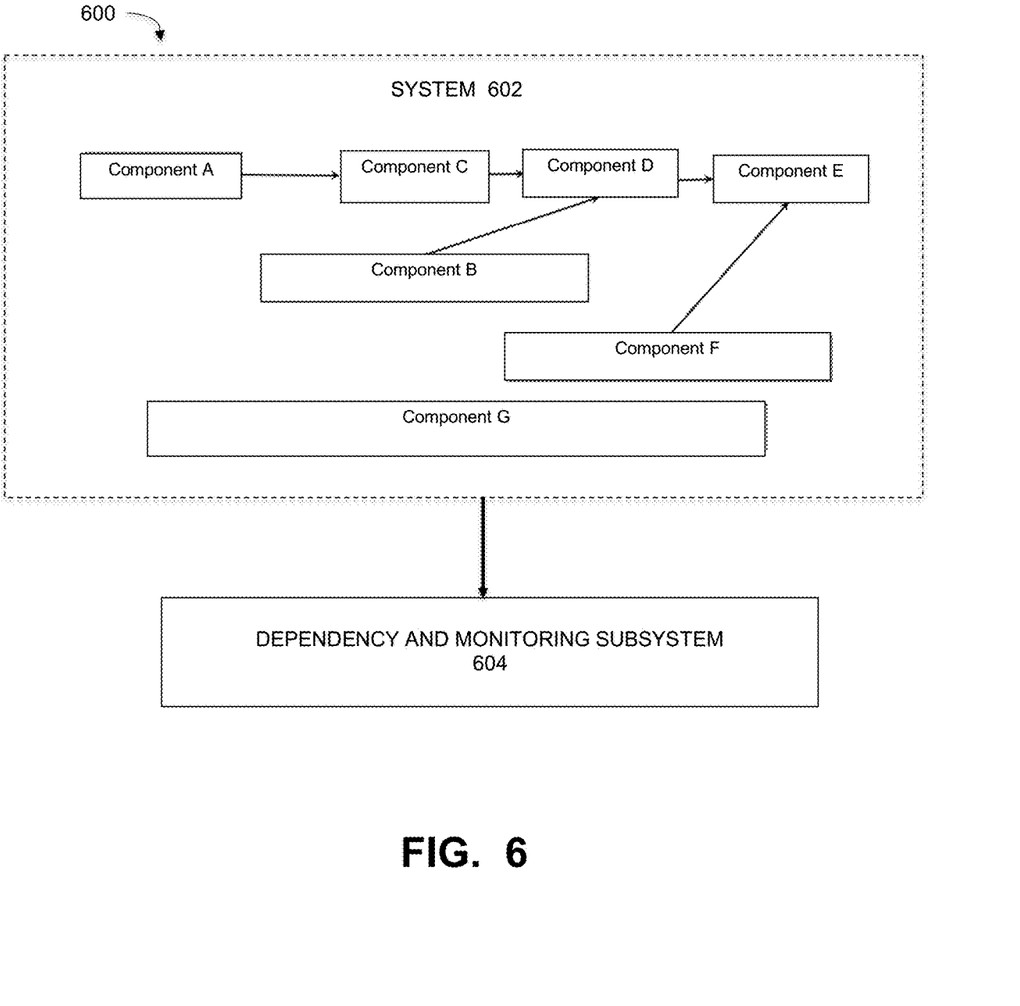
FIG. 6 illustrates a system 600 for generating a directed graph for a generic system, under some embodiments.

In an embodiment, a directed graph is created upon start up (or bootup) of a device, system, or network, depending on the scale of the system and the pipelined process. FIG. 6 illustrates a system 600 for generating a directed graph for a generic system, under some embodiments. As shown in FIG. 6, example generic system 602 has seven components (denoted components A through G). A dependency and monitoring subsystem 604 coupled to the system 602 monitors the components and identifies their dependencies based on initial wakeup processes (initialization) upon startup. For example, as the system boots up, the dependencies are recorded by the dependency and monitoring subsystem 604 as follows:

A is dependent on C, D and E;
B depends on D and E;
C depends on D and E;
D depends on E;
E depends on Null;
F depends on E;
G depends on Null.

These dependencies are shown as one-way arrows connecting pairs of components in system 602. The dependencies can be recorded in component 604 by way of callbacks or explicit APIs, or any other method as appropriate for an implementation and system configuration.

Figure 7:
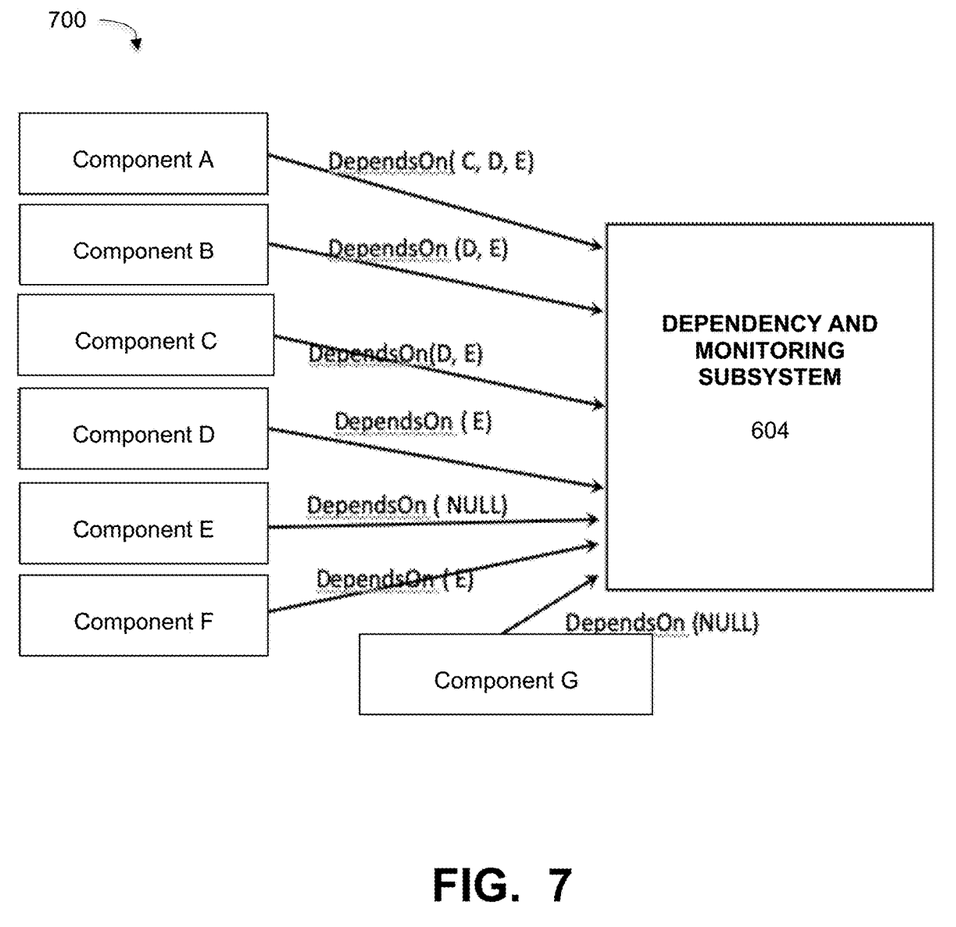
FIG. 7 illustrates the dependencies of the components of FIG. 6 to create a directional graph, under an example embodiment.

Once all the components have been initialized and are active, a dependency map is created for the system using the dependencies recorded by the dependency and monitoring subsystem 604. FIG. 7 illustrates the dependencies of the components of FIG. 6 to create a directional graph, under an example embodiment. As shown in diagram 700, the components A-G are listed and their dependency relationships are determined and recorded in the dependency monitoring subsystem 604, such as in a list or tabulated format as shown above.

A directed graph is generated from the dependencies using the one-way relationships as tabulated, along with certain rules. One such rule is that circular dependencies are not permitted. Thus, dependencies go in one direction down a pipeline to a final node component or subsystem. The components must register their dependencies with the dependency and monitoring subsystem 604 through a library of APIs or similar method, and all registered components (registrants) are monitored periodically to verify or re-validate their respective dependencies. This monitoring period may be set by the system, such as on an hourly, daily, weekly basis, etc. based on system configuration and complexity.

A directed graph is used as the data structure to store the dependency information efficiently. A directed graph can detect circular dependencies, and thus it inherently enforces the most important rule of the graph. As the components shut down, the dependency and monitoring subsystem 604 would tear down the dependencies.

In an embodiment, the directed (dependency) graph is used to make a timeout decision in a system that has a health monitor (or similar) component that imposes a time restriction on processing requests in each subsystem.

Figure 8A:
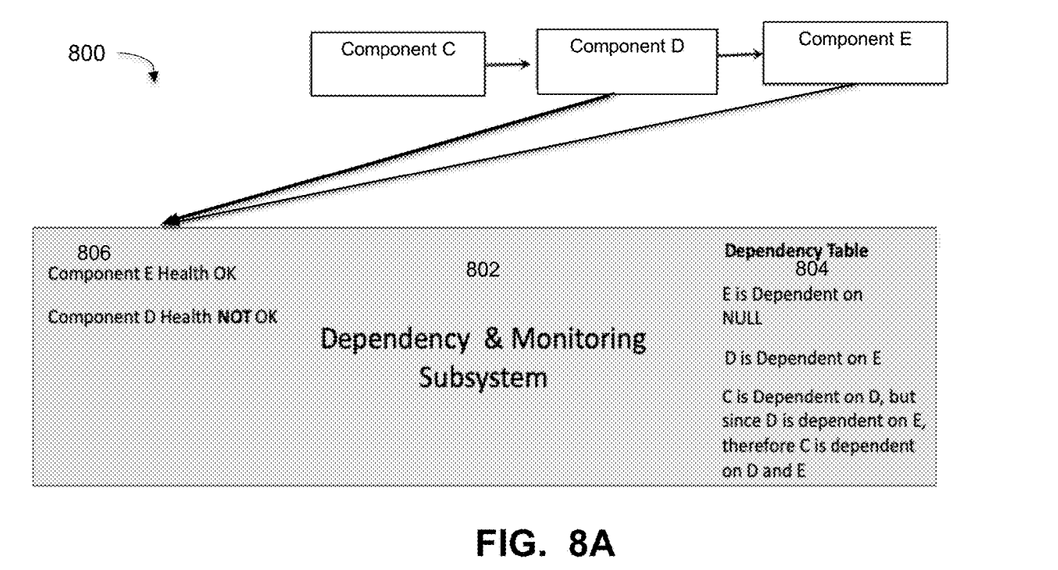
FIG. 8A illustrates an example system with dependent components where some example health conditions are provided for the components.

FIG. 8A illustrates an example system with dependent components where some example health conditions are provided for the components. System 800 includes three components, C, D, and E, where component D is dependent on component E, and component C is dependent on components D and E, as shown in the dependency table 804 created and stored in the dependency and monitoring subsystem 802. A health monitor provides certain health information 806 that is also stored or accessible by subsystem 802. For the example of FIG. 8A, E is reporting all OK, but D reports health not OK. The dependency and monitoring subsystem 802 monitors the health of the components to basically determine if the queues are being cleared based on the outstanding I/O requests to the component. If at least some degree of progress is being made to clear a queue, a component may be declared healthy by the subsystem 802, thus allowing the panic condition to be deferred accordingly. In cases where no progress is made over a certain period of time, or any such progress is at too slow a rate, the component may be declared unhealthy and no timeout extension is provided.

Figure 8B:
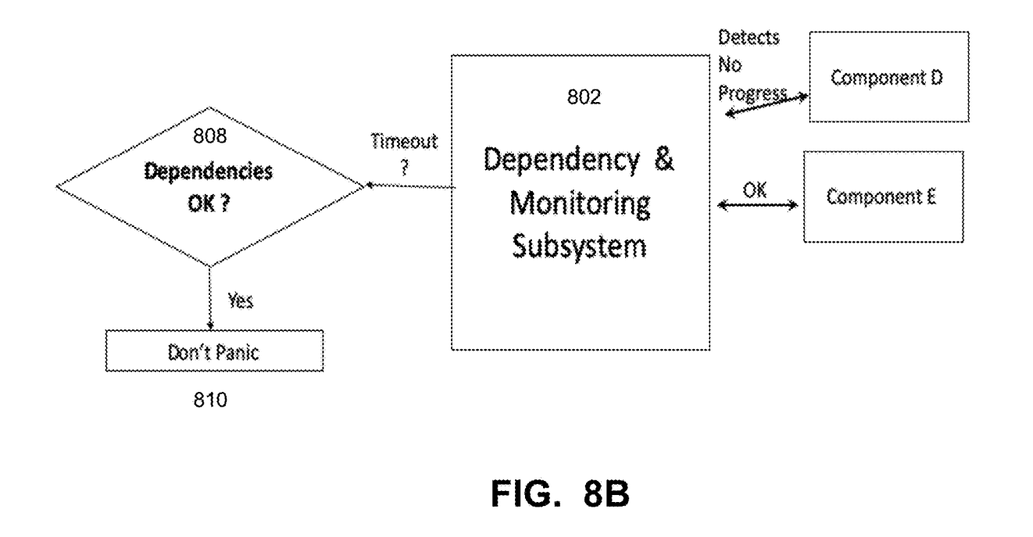
FIG. 8B illustrates using a dependency graph and component health information to make a panic decision, under some embodiments.

The dependency and monitoring subsystem 802 is consulted if a component timeout should defer corrective action, such as in the case where a component health is compromised or not OK. FIG. 8B illustrates using a dependency graph and component health information to make a panic decision, under some embodiments. Using the dependencies of FIG. 8A, and the example health conditions 806 of components E and D, FIG. 8B illustrates a panic decision process for FIG. 8A, under an example timeout situation. As shown in FIG. 8B, the dependency and monitoring subsystem 802 monitors the two component D and E that component C is dependent upon (directly or indirectly). Component E is showing OK health (in 806), while Component D is showing health not OK so subsystem 802 may detect no progress for Component D. When the amount of time of no progress in Component D reaches and exceeds the defined timeout period, Component D is deemed to be deadlocked and can trigger a panic condition. The dependency and monitoring subsystem 802, however also monitors the progress of Component E, as Component D is dependent upon Component E. Thus, decision block 808 checks whether or not any downstream components from Component D are still operating properly, which would indicate that any problems with Component D are not due to any downstream components. Since component E is making progress, and D is dependent on E; although D is not making progress, it may be okay to delay the corrective action 810 that would be triggered by the panic condition if Component D is in a genuine deadlock. If Component D was not dependent on any further downstream components, or if those components were all themselves also deadlocked, a panic condition would be raised upon reaching the timeout period for any of those components.

In the case of a no panic condition 810 being called, the timeout period is extended to defer the deadlock determination, such as by doubling the amount of time allocated to the timeout period, e.g., from 5 minutes to 10 minutes or any other appropriate time period and extension factor (e.g., 3 times or 4 times the initial timeout period, etc.). As long as the 'no progress' situation clears up within this extended period, the panic condition will be avoided. Such a timeout extension period may be applied iteratively, such as doubling of the initial timeout period for x (e.g., 2 to 4) number of times, depending on system configuration. There may be an absolute upper timeout limit set, so that the timeout extension and deferral of the panic call is not infinite. As the components shut down, the dependency and monitoring subsystem 802 would tear down the defined dependencies so that dependencies are re-established upon the next startup.

Figure 9:
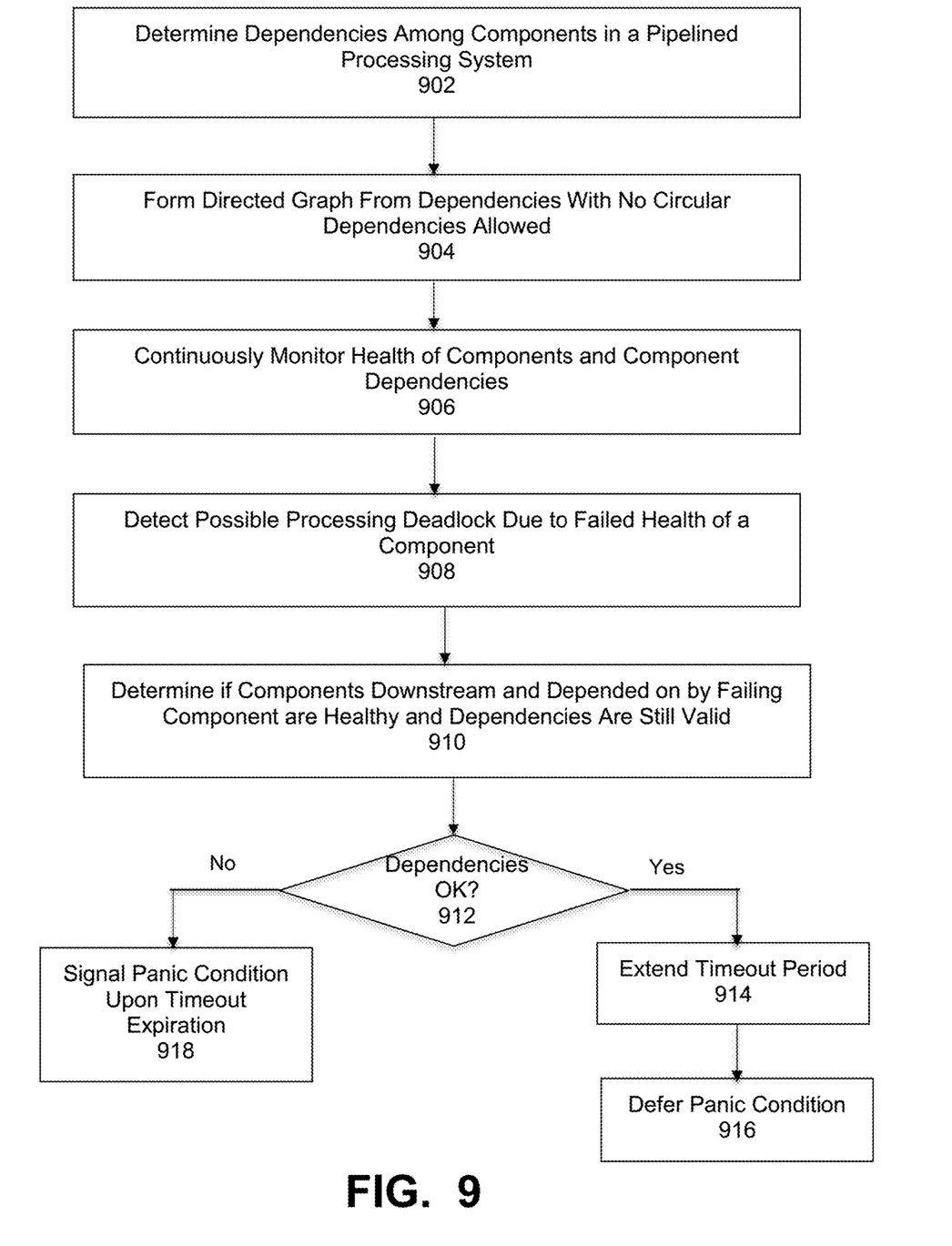
FIG. 9 is a flowchart illustrating a method of reducing false positive panic alerts using a directed graph, under some embodiments.

FIG. 9 is a flowchart illustrating a method of reducing panic conditions due to component health problems using a directed graph, under some embodiments. The process of FIG. 9 begins by determining the dependencies among components in a pipelined processing system, 902. Such a system may be interconnected individual devices or computer, or layers within a file system as shown in FIG. 5, or any other similar system with multiple components. The pipelined architecture means that data progresses through a chain of components (or subsystems) through individual links between components from a source to a destination, such as from a data source or file system to a storage system through one or more processing layers. Each component may be dependent on one or more downstream components, either directly or indirectly, however, components may not be mutually dependent themselves or on each other (no circular dependencies).

In an embodiment, the dependencies are determined upon startup of the system through initialization processes that indicate an order of data processing. For example, in the layered system of FIG. 5, the NFS 202 starts sending data generated by data sources that is progressively processed by the various CS, SS, and CM layers before being stored in cloud storage 212 by the Cloud Access Layer 210. This sequence of data processing illustrates a clear initialization sequence that determines the pipeline of system 500 and the dependencies of each of the NFS, CS, SS, and CM layers on their immediate downstream neighbors.

Once the dependencies are established in step 902, a directed graph among these components is formed 904, such as described above, and shown with reference to FIG. 8A. As data processing progresses, the components are monitored for progress, such as by a health or heartbeat monitor (HMON), 906. If a particular component sees an issue with itself or any downstream component that may cause its request processing queues to deadlock, 908, the system queries for problems with dependent components and uses the results to defer corrective actions, such as panic alarms and shutdown. However, it first determines if any downstream components that a failing component depends on are still operating properly, and are still in a valid dependency. Thus, in step 912, the process performs a dependency check 912 for these conditions. If a validly depended upon component is still operating fine, it is assumed that the problem with the failing is not due to this component, and that continued proper operation of this component may overcome any potential deadlock of the upstream component. In this case, the timeout period of the upstream component is extended to allow this possible clearance to occur, 914, and the panic condition is deferred for the time of this extended timeout period, 916. This extension may be iteratively applied depending on system configuration, but an absolute timeout value may be defined to prevent infinite deferral of the panic condition, in order to allow a genuinely deadlocked system to shut down as planned. If either the upstream component has no downstream components, or such downstream components are either no longer depended upon, or are all failing, the process may signal the panic condition upon the initial timeout period of the upstream component, 918.

In this way, deadlock of a particular component may or may not signal a panic condition depending on whether any of its presently downstream and depended on components are operating properly. The continuously monitored knowledge of proper operation of all downstream components is thus used to intelligently apply or defer panic alerts to keep the system operating uninterrupted from panic conditions that might soon or eventually be fixed by continued operation of the system pipeline.

In an embodiment, the directed graph is used to provide hints as to one or more queues most likely to create deadlocks based on the dependencies of components registered in the system. An analysis component or process can be used to analyze the directed graph to identify potential bottlenecks in the system, such as any component that is depended on by many other components, components with queues of insufficient size to handle larger data loads, and so on.

In a further embodiment, certain artificial intelligence and machine learning (AI/ML) techniques may be used to learn patterns of delays or bottlenecks in a system to build a model that can be used to predict potential deadlock situations in other similar or comparable systems.

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 10:
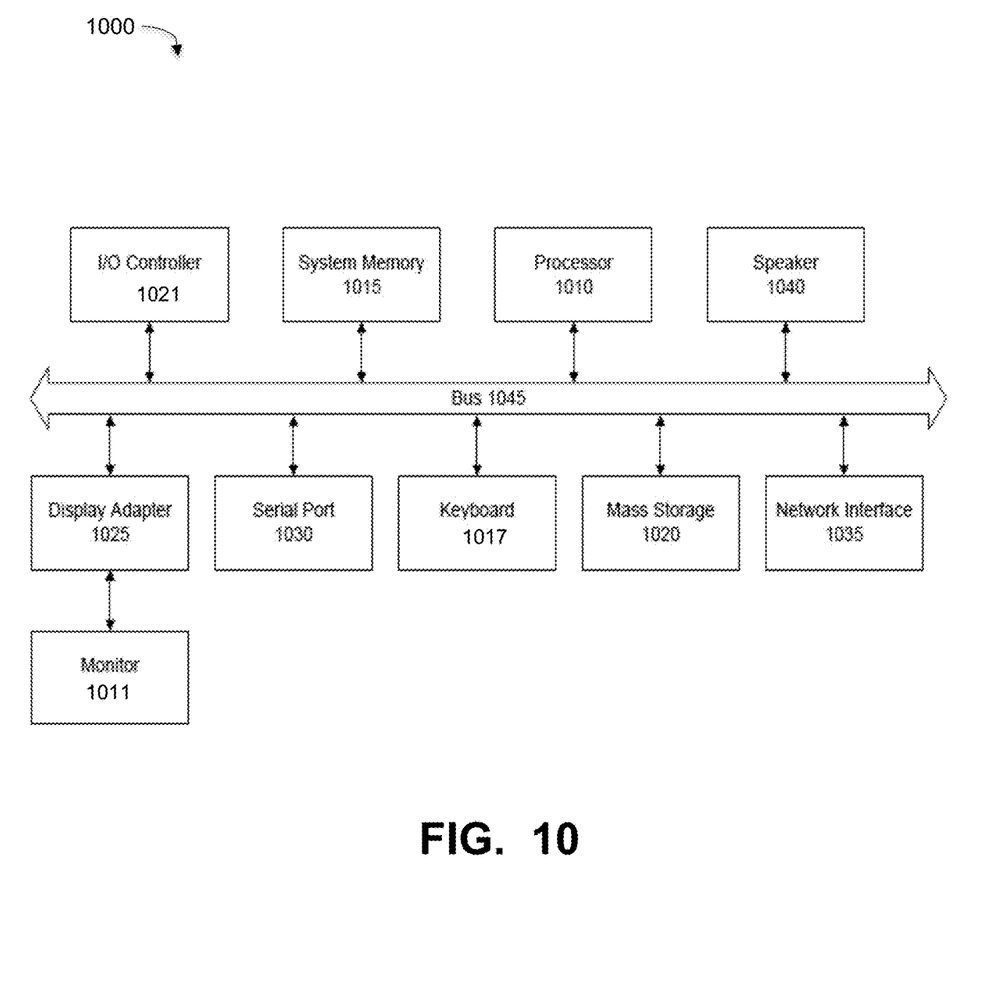
FIG. 10 is a system block diagram of a computer system used to execute one or more software components of a system reducing false positive panic alerts using a directed graph, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 10 shows a system block diagram of a computer system used to execute one or more software components of the present system described herein. The computer system 1000 includes a monitor 1011, keyboard 1017, and mass storage devices 1020. Computer system 1000 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of maintaining uninterrupted system performance, comprising:
   determining all dependencies among components in a pipelined system processing data from a data source to a destination;

generating from the dependencies, a directed graph for the components;
continuously monitoring a health of each component and a present dependency of each component in the directed graph;
defining a panic response triggered by a timeout period for each component, the panic response comprising a shutdown of the system in the event of a genuine system deadlock;
upon detection of a problem causing potential deadlock in an upstream component, determining in a dependency check, if any downstream component depended on by the upstream component is still properly processing the data; and
extending, if the downstream component is still properly processing data, the timeout period of the upstream component for a defined amount of extension time to prevent the panic response for the period of the extension time.

2. The method of claim 1 wherein the dependency check further verifies that the downstream component is still validly depended on by the upstream component.

3. The method of claim 2 wherein the extension time comprises a doubling of an initial timeout period for a respective component, and can be iteratively applied over one or more monitoring cycles, the method further comprising applying an absolute timeout value to prevent infinite deferral of the panic condition.

4. The method of claim 2 wherein the dependencies are determined upon startup of the system through initialization processes that indicate an order of data processing through the data pipeline.

5. The method of claim 2 wherein the upstream component is functionally closer to the data source and the downstream component is functionally closer to the destination.

6. The method of claim 5 wherein the data source comprises clients generating data managed by a file system, and wherein the destination comprises cloud network storage, and wherein the pipeline comprises components including, in order of dependency: a network file system (NFS), a content store (CS), a segment store (SS), a container manager (CM), and a Cloud Access Layer (CAL).

7. The method of claim 6 wherein each component of the pipeline maintains a respective queue for storing data requests processing data received from an immediate upstream component.

8. The method of claim 7 wherein a panic condition is triggered for a component when data has been in the respective queue for the component in excess of the timeout period of the component.

9. The method of claim 1 wherein the directed graph is used to provide hints as to one or more queues most likely to create deadlocks based on the dependencies of components registered in the system.

10. The method of claim 9 further comprising applying machine learning processes to create models that can be used to predict potential deadlocks in other systems similar to the system.

11. A system comprising:
a pipelined structure of processor-based hardware components processing data from a data source to a destination, each component maintaining a respective queue storing data processing requests from one or more upstream components, wherein a defined panic response is triggered by a timeout period for each component if a respective queue is full for a time exceeding the timeout period, the panic response comprising a shutdown of the system in the event of a genuine system deadlock;
a processor-based health monitoring subsystem continuously monitoring a health of each component and a present dependency of each component in the directed graph; and
a processor-based dependency subsystem
determining all dependencies among components in the pipeline,
generating from the dependencies, a directed graph for the components,
determining, upon detection of a problem causing potential deadlock in an upstream component, and in a dependency check, if any downstream component depended on by the upstream component are still properly processing the data; and
extending, if the downstream component is still properly processing data, the timeout period of the upstream component for a defined amount of extension time to prevent triggering of the panic response for the period of the extension time.

12. The system of claim 11 wherein the dependency check further verifies that the downstream component is still validly depended on by the upstream component, and wherein the panic response comprises an emergency shutdown of the system in the event of a genuine system deadlock.

13. The system of claim 12 wherein the extension time comprises a doubling of an initial timeout period for a respective component, and can be iteratively applied over one or more monitoring cycles, the method further comprising applying an absolute timeout value to prevent infinite deferral of the panic condition.

14. The system of claim 13 wherein the dependencies are determined upon startup of the system through initialization processes that indicate an order of data processing through the data pipeline.

15. The system of claim 11 wherein the upstream component is functionally closer to the data source and the downstream component is functionally closer to the destination, and wherein the data source comprises clients generating data managed by a file system, and wherein the destination comprises cloud network storage, and wherein the pipeline comprises components including, in order of dependency: a network file system (NFS), a content store (CS), a segment store (SS), a container manager (CM), and a Cloud Access Layer (CAL).

16. The method of claim 15 wherein the directed graph is used to provide hints as to one or more queues most likely to create deadlocks based on the dependencies of components registered in the system.

17. The system of claim 16 further comprising a machine learning component applying certain artificial intelligence processes to create models that can be used to predict potential deadlocks in other systems similar to the system.

18. A non-transitory computer readable medium containing programming code which, when executed by a processor in a computer system, causes the computer system to perform method comprising:
determining all dependencies among components in a pipelined system processing data from a data source to a destination;
generating from the dependencies, a directed graph for the components;

continuously monitoring a health of each component and a present dependency of each component in the directed graph;

defining a panic response triggered by a timeout period for each component, the panic response comprising a shutdown of the system in the event of a genuine system deadlock;

upon detection of a problem causing potential deadlock in an upstream component, determining in a dependency check, if any downstream component depended on by the upstream component is still properly processing the data; and extending, if the downstream component is still properly processing data, the timeout period of the upstream component for a defined amount of extension time to prevent the panic response for the period of the extension time.

19. The non-transitory computer readable medium of claim 18 wherein the dependency check further verifies that the downstream component is still validly depended on by the upstream component, and further wherein the panic response comprises an emergency shutdown of the system in the event of a genuine system deadlock.

* * * * *